No. 778,893. PATENTED JAN. 3, 1905.
C. J. REED.
GALVANIC BATTERY.
APPLICATION FILED JULY 12, 1901.
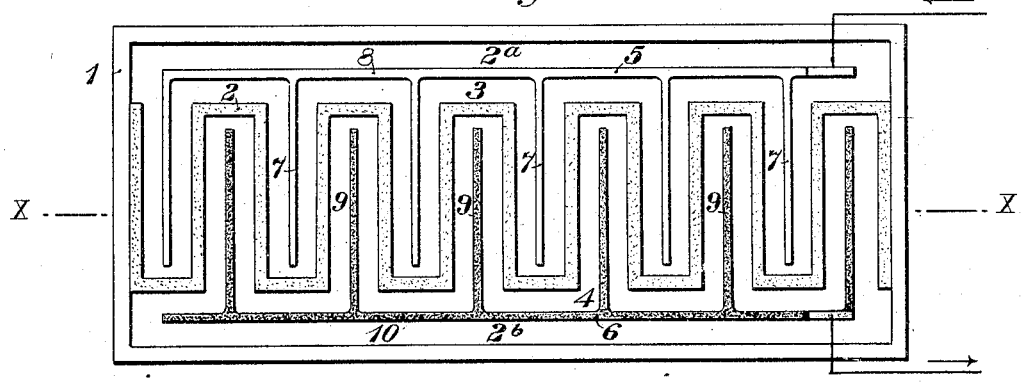
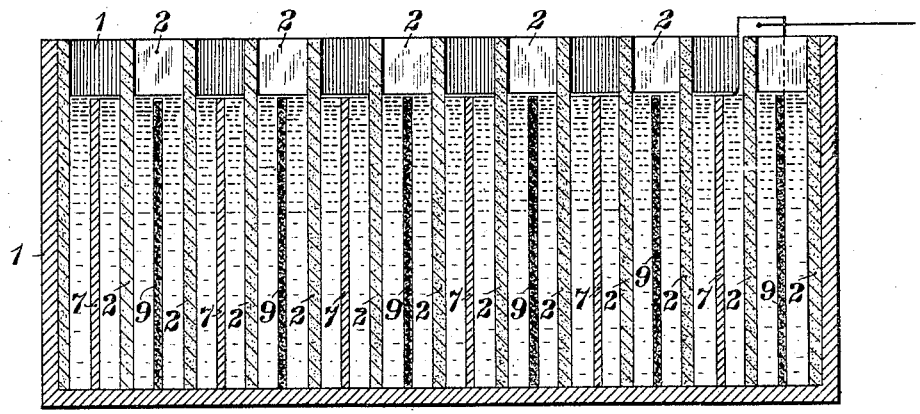
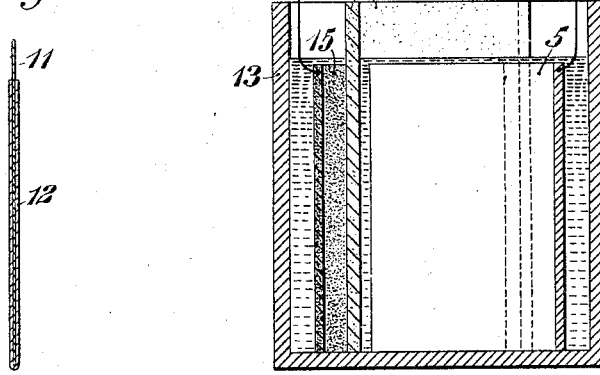
WITNESSES:
C. L. Belcher
Birney Hines
INVENTOR
Charles J. Reed
BY
Wesley G. Carr
ATTORNEY.

No. 778,893.

Patented January 3, 1905.

UNITED STATES PATENT OFFICE.

CHARLES J. REED, OF PHILADELPHIA, PENNSYLVANIA, ASSIGNOR TO SECURITY INVESTMENT COMPANY, A CORPORATION OF PENNSYLVANIA.

GALVANIC BATTERY.

SPECIFICATION forming part of Letters Patent No. 778,893, dated January 3, 1905.

Application filed July 12, 1901. Serial No. 68,024.

*To all whom it may concern:*

Be it known that I, CHARLES J. REED, a citizen of the United States, residing at Philadelphia, in the county of Philadelphia and State of Pennsylvania, have invented a new and useful Improvement in Galvanic Batteries, of which the following is a specification.

My invention relates to galvanic batteries; and it has for its object to provide apparatus of this character which shall be inexpensive in construction and efficient in operation and which may be readily regenerated without material trouble or expense.

My invention is illustrated in the accompanying drawings, in which—

Figure 1 is a plan view of a battery constructed in accordance with my invention. Fig. 2 is a sectional view taken on line X X of Fig. 1. Fig. 3 is a detail view of a portion of an electrode of modified construction. Fig. 4 is a sectional view of a regenerating-cell.

Referring particularly to Figs. 1 and 2, 1 is a receptacle which may be of suitable non-conducting material and is divided by a porous partition 2 into two compartments $2^a$ and $2^b$, the former of which contains a liquid electrolyte 3, consisting of a solution of one or more ferrous salts—such, for example, as ferrous chlorid or ferrous sulfate or a combination of two or more of such salts. The other compartment, $2^b$, contains a liquid electrolyte 4, consisting of a solution of one or more ferric salts—such, for example, as ferric chlorid or ferric sulfate or a combination of two or more of such salts.

In the electrolyte 3 is located an iron electrode 5, and in the electrolyte 4 is located an electrode 6, that is electronegative to iron when employed in connection with electrolytes such as those heretofore specified. This electrode may be formed of carbon, platinum, platinized carbon, or any other substance that may be found suitable for the purpose.

The porous partition is employed to prevent mixing of the two electrolytes at a too-rapid rate, and it may have any suitable form, the zigzag form here shown being employed in order to facilitate the employment of electrodes having large surfaces within a comparatively small cell. In order to provide a large surface for exposure to the electrolyte 3, the electrode 5 is made to consist of a series of plates 7, that project from a base-plate 8 between the transverse walls of the partition 2. For the same reason the electrode 6 is made to comprise a series of plates 9, that project laterally from a base-plate 10.

In the use of the apparatus as a battery when the circuit is closed through the electrodes the electrode 5 becomes the anode and the electrode 6 the cathode. The electrolytic action which takes place when the circuit is closed dissolves the iron of the electrode to form a ferrous salt, which is similar to that in which the electrode is immersed. The ferric salt in the other compartment of the cell is also simultaneously changed into a ferrous salt and this action continues until the ferric salt in compartment 2 has all become transformed into a ferrous salt or has been transformed to such an extent as to render the battery no longer efficient in its operation. When either of these conditions is reached, the solution of ferrous salt may be removed from the compartment $2^b$ and a fresh solution of ferric salt be placed therein. A portion of the ferrous salt may also be removed from the compartment $2^a$ in case the quantity is greater than is needed. This ferrous solution may be regenerated by subjecting it to one or more oxidizing agents—such as oxygen, bromin, chlorin, ozone, or hydrogen peroxid—the oxidizing agent being preferably blown through the solution. The oxidation may also be hastened by applying heat to the solution, if desired. This method of regeneration and also the method of generating electrical energy herein set forth are not here claimed, since they are made the subject-matter of another application, Serial No. 70,536, filed August 1, 1901.

When the battery is exhausted through exhaustion of the ferric salt in compartment $2^b$, the battery may be regenerated by passing an electric current in the opposite direction—that is, from the electrode 6 to the electrode 5—through the electrolytes, provided the latter electrode has not become consumed. This action redeposits iron from the ferrous salt 3 upon the electrode 5 and reconverts the ferrous salt in the compartment $2^b$ into a ferric salt. When regenerated in this manner, the battery becomes an accumulator or storage battery.

In using the battery as an accumulator I prefer to employ an electrode $5^a$ (shown in Fig. 3) in the ferrous electrolyte, which has a base 11, of copper, carbon, or other suitable electronegative substance, upon which a coating 12, of iron, is electrolytically deposited. With an electrode of this construction the battery may be discharged until all or nearly all of the iron is dissolved and may be recharged without any substantial alteration of the form of the electrode, whereas if the electrode were formed entirely of iron it would be irregularly dissolved during the discharging operation and would be unlikely to retain its form permanently when subjected to a number of successive charges and discharges. I desire it to be understood, however, that the "active-material" electrode may be either wholly or partially formed of iron, and whenever it is referred to herein as an "iron" electrode such designation is not to be so construed as to exclude the employment of a plate of different material upon which the iron is supported.

In using the cell as an accumulator I prefer to employ exceedingly hard and durable carbon or platinum for the electrode 6 in order that it shall be less liable to disintegration or destruction by the charging-current. I find also that it is advisable in charging such a battery to employ a current of such strength that no gas is evolved from the electrode 6. Under these conditions the electrode seems to suffer little or no disintegration.

Instead of regenerating the battery as above set forth I may regenerate the materials as follows: The excess of ferrous solution formed during the discharging operation, whether it be in the compartment $2^a$ or in the compartment $2^b$, may be placed in an electrolytic apparatus—such, for example, as that indicated in Fig. 4—in which the receptacle 13 is divided by a porous partition 14 into two compartments. The exhausted electrode 5 of the battery is placed in one of the compartments, a suitable electrode 15 of hard carbon, platinum, or other suitable material, being located in the other compartment. Electric current from any suitable source of electrical energy—such, for example, as a dynamo—is then sent through this cell, as indicated by the arrows. The electrochemical action in the regenerating-cell (shown in Fig. 4) causes iron to be redeposited on the electrode 5 and ferric salt to be formed in the compartment in which the electrode 15 is located. When this operation has proceeded a sufficient length of time, the electrode 5 may be returned to its place in the compartment $2^a$ and the solution surrounding the electrode 15 may be placed in the compartment $2^b$, and the battery be thus restored to operative condition. This regenerating apparatus is preferably of similar form to that shown in Figs. 1 and 2 in order that the iron may be uniformly deposited upon electrode 5.

During the discharging operation of the battery, whether it be operating as a primary or as a secondary battery, the ferric salt acts as a depolarizer and the ferrous salt as a solvent.

I claim as my invention—

1. A galvanic battery comprising a solution of one or more ferrous salts, an iron electrode located in said solution, a solution of one or more ferric salts, a partition having a high degree of porosity between said solutions and an electronegative electrode located in the solution of ferric salt or salts.

2. A galvanic battery comprising a solution of one or more ferrous salts, an iron electrode located in said solution, a solution of one or more ferric salts, a partition having a high degree of porosity between said solutions and a carbon electrode located in the solution of ferric salt or salts.

3. A galvanic battery comprising a solution of ferrous sulfate, an iron electrode located in said solution, a solution of ferric sulfate, a partition having a high degree of porosity between said solutions and an electronegative electrode located in the solution of ferric sulfate.

4. A galvanic battery comprising a solution of ferrous sulfate, an iron electrode located in said solution, a solution of ferric sulfate, a partition having a high degree of porosity between said solutions and a carbon electrode located in the solution of ferric sulfate.

5. A galvanic battery comprising a solution of a ferrous salt, an iron electrode located in said solution, a solution of a ferric salt, an electronegative electrode located in said ferric-salt solution and a partition having a high degree of porosity for preventing rapid mixing of the two solutions.

6. A galvanic battery comprising a receptacle containing a solution of a ferrous salt and a solution of a ferric salt separated by a partition having a high degree of porosity, an electrode having an iron surface and located in the solution of ferrous salt and an electronegative electrode located in the solution of ferric salt.

In testimony whereof I have hereunto subscribed my name this 10th day of July, 1901.

CHARLES J. REED.

Witnesses:
JAMES B. YOUNG,
BIRNEY HINES.